United States Patent [19]

Schoen

[11] 4,197,386

[45] Apr. 8, 1980

[54] PROCESS FOR CHLORINATING ETHYLENE POLYMERS

[75] Inventor: Löwhardt A. A. Schoen, Geleen, Netherlands

[73] Assignee: Stamicarbon, B.V., Geleen, Netherlands

[21] Appl. No.: 878,450

[22] Filed: Feb. 16, 1978

[30] Foreign Application Priority Data

Feb. 16, 1977 [NL] Netherlands ........................ 7701599

[51] Int. Cl.$^2$ ............................................... C08F 8/22
[52] U.S. Cl. ..................................... 525/356; 525/358
[58] Field of Search ..................................... 526/43, 45

[56] References Cited

U.S. PATENT DOCUMENTS

| 4,029,862 | 6/1977 | Liu et al. ................................. 526/22 |
| 4,039,732 | 8/1977 | Schoen et al. ........................ 526/17 |

FOREIGN PATENT DOCUMENTS

| 834905 | 5/1960 | United Kingdom ...................... 526/43 |
| 1228921 | 4/1971 | United Kingdom . |
| 1228922 | 4/1971 | United Kingdom . |

*Primary Examiner*—William F. Hamrock
*Attorney, Agent, or Firm*—Cushman, Darby & Cushman

[57] ABSTRACT

An improved process for chlorinating high density polyethylene "in bulk" is described, with a two-stage reaction, the first at temperatures below the crystalline melting point, and the second above that temperature, and using a polyethylene starting material having a critical combination of characteristics, as described.

12 Claims, No Drawings

PROCESS FOR CHLORINATING ETHYLENE POLYMERS

INTRODUCTION

This invention relates to a process for chlorinating high density polyethylene. By the term "high density polyethylene" used herein, there is meant ethylene polymers obtained by polymerization of ethylene (if required with minor quantities of another 1-alkene), in the presence of so-called coordination catalysts. Catalysts of this kind are generally known and are generally composed of at least one compound of a transition metal from the Groups IV to VI or 8 of the Periodic System.

These are, in particular, the so-called Ziegler catalysts, as a rule based on a titanium compound, and, in addition, an organometallic compound of a metal from the groups 1 to 3 inclusive of the Periodic System, more particularly an organo-aluminum compound, or catalysts on the basis of a transition metal oxide, namely chromium oxide or molybenum oxide on an inorganic carrier and, optionally, with an organometallic compound of a metal from the Groups I to III inclusive of the Periodic System.

Polyethylene prepared according to polymerization processes of this kind is called "high density polyethylene", as distinguished from "low density polyethylene" (which is obtained by polymerization of ethylene at very high pressures with radical-forming agents such as peroxides, peroxycarbonates and the like). The density of such high density polyethylenes is at least 0.930 and may be as high as 0.970.

Within the scope of this invention the term high density ethylene polymers is to be understood to mean both homopolymers of ethylene and such copolymers thereof as may contain at most about 5 mol.-% of an α-alkene, comonomer usually propylene or butylene-1.

BACKGROUND OF THE INVENTION

The halogenation of polyolefins and, notably, the chlorination of polyethylene, has been known in general for a long time already insofar as low density polyethylene is concerned.

For instance, the chlorination of polyethylene is described in the U.S. Pat. No. 2,183,556, dating from Dec. 1939.

Chlorinated polyethylene also became commercially available by the beginning of the nineteen-forties. However, it was an expensive product, the preparation of which was difficult. The physical properties obtained were not particularly good.

Shortly after the development of processes of polymerization of ethylene using the so-called coordination catalysts, the interest in chlorinated polyethylene, in this case prepared from high density polyethylene, revived.

Thereupon, the chlorination methods for both low and high density polyethylene saw further development.

The chlorination processes which are now known can generally be distinguished into three types, namely the chlorination of polyethylene "in solution", "in suspension" or "in bulk".

Chlorination of polyethylene in solution is known from, e.g., U.S. Pat. Nos. 2,398,803; 2,748,105; 2,920,064 and 3,060,164.

Chlorination of polyethylene in an aqueous suspension is known from, e.g., U.S. Pat. No. 2,592,763.

U.S. Pat. No. 2,890,213 describes the chlorination of polyethylene in a fluidized bed, and British Pat. No. 834,905 describes the chlorination of free-flowing polyethylene, in each case in the absence of a liquid suspension agent or solvent, i.e., the so-called "chlorination in bulk".

The chlorinated polyethylenes obtained by these different chlorination methods show differences in properties, even if one starts from the same polyethylene material, and chlorinates to the same chlorine content. This appears to be connected principally with the more or less statistical distribution of the chlorine in and along the chlorinated polyethylene polymer chains, as is explained in French Pat. No. 1,316,044 and in British Pat. Nos. 843,209 and 950,374. Chloropolyethylenes with a non-statistical distribution of the chlorine atoms possess a much higher glass transition temperature than do chloropolyethylenes having a statistical chlorine distribution, and are also much more rigid, hard and brittle.

A number of disadvantages attach to each of the above three methods mentioned, viz., chlorination in solution, in suspension, or in bulk.

The process of chlorination in solution is expensive. The solubility of polyethylene in organic solvents which are inert to chlorine is relatively small, thus large quantities of solvent are needed. As a rule, expensive polyhalogen hydrocarbons must be used for this purpose. The chlorinated polyethylene product must also be later freed from solvent and removal of the last traces thereof is difficult. The separation itself is cumbersome and expensive.

At relatively low temperatures, the chlorination of polyethylene in suspension does not proceed in a statistical manner. A kind of block copolymer structure, having both chlorinated and non-chlorinated segments in the molecule, appears to be obtained, unless the chlorination is continued for very long times until high chlorine contents result. Block copolymers of this kind are hard and brittle.

Usually, however, it is desired to obtain a soft and flexible chloropolyethylene with a crystallinity of less than about 2%, i.e., the chloropolyethylene should be fully or at least substantially amorphous. For certain applications stronger chloropolyethylene is required, but still the material should not be hard or brittle. In such case, however, while the crystallinity will lie at above 2%, it should still be less than about 10% in most cases.

In French Pat. No. 1,316,044, already mentioned, a two-stage process has been described for obtaining such a more statistical chlorination of polyethylene.

In that process, the second stage is carried out at a rather high temperature, viz., above the crystalline melting point of the polyethylene. (By crystalline melting point is meant the temperature at which the crystallinity disappears, as appears for instance from the disappearance of the double refraction, or characteristic X-ray diffraction lines. Preferably, the disappearance of the crystallinity is measured by Differential Scanning Calorimetry. In general, high density polyethylene has a crystalline melting point of between 107° and 120°.)

However, with chlorination in suspension at a high temperature introduces the disadvantage that, at such high temperatures, and even under pressure, chlorine will dissolve to only a very small degree in the suspension agent (which is generally water). As a result, the chlorination process proceeds very slowly and very long reaction times are required. Subsequent processing of the product by centrifuging and drying is also expensive. Moreover, the by-product, hydrogen chloride, can hardly, or not all, be usefully recovered.

In British Pat. No. 843,209 the differences between chlorinated polyolefins with a statistical and a non-statistical chlorine distribution are also discussed. Intermediate forms thereof are called hybrid polymers. Contrary to the process according to French Pat. No. 1,316,044, these are prepared according to British Pat. No. 843,209 by carrying out the chlorination partly in suspension and partly in solution. However, such a process is very cumbersome. The polyethylene chlorinated in suspension must first be separated from the suspension, and then subsequently dissolved, only following which can the second solution stage be carried out.

Chlorination in bulk, as described for instance in the above-mentioned U.S. Pat. No. 2,890,213 and British Pat. No. 834,905, can be carried out at rather high temperatures, with the chlorination reaction proceeding rather rapidly. However, a disadvantage of this method is that the chlorination generally proceeds too fast during the initial phase. Since chlorination is an exothermic reaction, chlorination when finely divided polyethylene is chlorinated without a solvent or suspension agent local overheating of the polymer occurs very easily. As a result, the reaction speed is locally increased in those places. This local development of heat can in turn cause melting, agglomeration and lump formation, as well as decomposition and even burning of the polymer. These circumstances are also attended by the development of an extremely undesirable discoloration in the product.

When chlorinating in bulk, it is also difficult to avoid the sintering together of the ethylene polymer particles to some degree, thus again forming agglomerates which, in turn, cannot be homogeneously chlorinated. The ethylene polymer also becomes discolored due to hot spots. Occurrence of these phenomena can be avoided by maintaining the chlorinating reaction at low temperatures, but then the reaction rates will be low, while non-statistical chlorination also takes place, as a result of which hard and brittle chlorinated ethylene polymers are obtained.

Chlorinations partly at temperatures below the crystalline melting point and partly above the crystalline melting point are not only known from French Pat. No. 1,316,044 already mentioned and said British Pat. No. 834,209, but also from, for instance, U.S. Pat. Nos. 2,398,803, 2,920,064; German Auslegeschrift No. 1,420,451; British Pat. Nos. 1,073,504 and 1,036,360.

However, the processes proposed so far for chlorination in bulk, i.e., in the absence of solvents and/or suspension agents, do not give satisfactory results, not even if they are carried out in a first stage below the crystalline melting point and in a second stage above the crystalline melting point.

It has also appeared that with chlorination in bulk, a chloropolyethylene which is too hard and too brittle or discolored is obtained. To avoid this discoloration, the chlorination must be carried out at low temperatures, in which case the occurrence of hot spots and the resulting discolorations can be avoided as much as possible. The temperatures at which such chlorination is then to be carried out, e.g., at 60° to 70° C., are considerably below the crystalline melting point. Only after such chlorination at low temperature has been carried out for such time as to reach a certain minimum chlorine content can the reaction temperature be increased, to above the crystalline melting point of the polyethylene. If the initial low temperature chlorination has, however, been inadequate, the further chlorination at the higher temperature will still lead to development of hot spots and the attending discolorations occurring.

Therefore, if one wants to avoid discolorations, it appears that the chlorination must first be carried out at temperatures which are below the crystalline melting point of the polyethylene, and for such a long time that the amount of hard and brittle chloropolyethylene thereby produced becomes so large that the quantity of polyethylene ultimately to be chlorinated at temperatures above the crystalline melting point is insufficient to yield an endproduct having satisfactory properties. On the other hand, if one tries to shorten the amount of chlorination taking place at temperatures below the crsytalline melting point, then discolorations and sintering will again occur when the temperature is later increased to above the crystalline melting point. Moreover, larger polymer particles form, and these cannot be homogeneously chlorinated.

To eliminate such objections and disadvantages of the chlorination process in bulk, it has also been proposed to mix the ethylene polymer with inorganic salts, which are then to be washed out again after the chlorination. Washing out and recovering, and/or discharging those salts, is, however, expensive, and renders this process economically unattractive.

DESCRIPTION OF THE PRESENT INVENTION

As just described, previous attempts to improve and solve the problems of chlorination of polyethylene have largely concentrated on various process variations and procedural modifications.

It has now been found, by contrast, that a substantial answer to the past difficulties lies in properly selecting and preparing the starting polyethylene material itself, and employing an "in bulk" chlorination method.

Thus, according to the present invention, it has now been found that the chlorination of polyethylene in bulk i.e., in the absence of solvents and/or suspension agents, by action of chlorine on a solid, finely divided high density ethylene polymer, can be carried out satisfactorily, while avoiding the above-mentioned disadvantages, if, for the chlorinating process there is used an ethylene polymer, having the following combination of characteristics: (i) at most 5 mol.-% of one or more $\alpha$-alkene co-monomer, with from 3 to 8 carbon atoms, particularly propene and/or butene, (ii) having a density of 0.930–0.970, (iii) a melt index of at most about 5, (iv) a particle size distribution of between about 50 to 2000$\mu$, (v) a porosity of at most about 0.15 cm$^3$/g, (vi) a BET surface area of at most about 1 m$^2$/g, and (vii) a wax content of at most about 1% by weight.

In order to achieve the desired more or less statistical distribution of chlorine throughout the polymer chain, the chlorination will have to be carried out, at least in part, above the crystalline melting point of the ethylene polymer. In order to avoid agglomeration and discoloration at such temperatures it is necessary first to chlorinate partly below the crystalline melting point. After sufficient chlorination below the crystalline melting point has taken place, the chlorination can then be continued above the crystalline melting point of the polyethylene.

This objective can also be realized in such a way that the chlorination is commenced at room temperature or at an elevated temperature slightly above room temperature, e.g., up to about 50° C., and that thereafter the temperature is gradually increased to above the crystalline melting point.

By simple test experiment it can easily be established for each ethylene polymer to be chlorinated the rate of temperature rise which will yield a chlorinated product having optimum properties.

If the temperature is increased too slowly, the chloropolyethylene obtained will be too brittle and too hard. Should the temperature be increased too quickly, sintering and/or discolorations will occur.

Also, if the chlorination is carried out at two definite specific temperatures, and, after the first stage, the temperature is rapidly raised to the chlorination temperature for the second stage, the required period for chlorination in the first stage can also be easily determined by experiment.

The chlorination time period for the first stage, or the chlorine content to be reached in the first chlorination stage, cannot in general be quantified. This period and this chlorine content depends on a number of factors, notably on the chlorination temperature employed in the first stage, the BET surface area, the particle size and the wax content of the ethylene polymer, the chlorine pressure and the like. However, the same principles apply as in the case of a uniform temperature rise. The chlorination below the crystalline melting point must be continued for such a time or to such a level of chlorine content that during the subsequent chlorination at the higher temperature sintering and/or discoloration will not occur.

Referring to the above-mentioned combination of characteristics required for the starting high density polyethylene, the following can be stated.

The term "wax content" is here understood to refer to that fraction of the polyethylene which is soluble in boiling hexane. Such wax content is readily determined by extracting the polyethylene in an extraction apparatus, for instance a Soxhlet apparatus, with boiling hexane. As stated, the wax content must be below about 1% by weight.

The "melt index" is determined according to ASTM D-1238, condition E, and is measured by the number of grams of polyethylene extruded, per 10 min. under the standard conditions, through a standard capillary. It should be at most about 5, as thus measured.

The "particle size" distribution is determined by sieve analysis. Those particles which are smaller than 50$\mu$, or larger than 2000$\mu$ should each be less than 1% by weight of the total polymer. By preference, the particle size distribution will lie fully within the limits of about 50 and about 2000$\mu$. A narrow size distribution, for instance 90% or more within a range of at most about 500$\mu$, is preferred to a broad size distribution, for instance one covering practically the entire range of 50–2000$\mu$. Preferably, the particle size distribution lies between about 50 and about 700$\mu$. Surveys, with literature references, on particle sizes and particle size distributions are given in Ullmann's "Enzyklopädie der technischen Chemie", 3rd Edition, Volume II/1, page 747 ff. and Kirk-Othmer "Encyclopedia of Chemical Technology", 2nd Edition, Volume 18, pp. 310–324.

The "porosity" is determined according to the mercury penetration method. In Helv. Chim. Acta 42, 2103 (1959) Guyer, Böhlen and Guyer give a description of apparatus for measuring the porosity according to this method. For a general explanation of the theory of this method, reference is made to L.A. de Wit and J.J.F. Scholten, Journal of Catalysis 36 36–47 (1975). The porosity should be at most about 0.15 cm$^3$/g.

The so-called "BET surface area" is determined according to the method described in J. Am. Chem. Soc. 60 309 (1938) by Brunauer, Emmet and Teller, and should be less than about 1 m$^2$/g.

It appears that insofar as the high density ethylene polymers as defined above are employed, the disadvantages which have so far been attached to the chlorination of ethylene polymers in bulk can now be obviated.

In this connection, it is assumed that the higher wax contents are at least co-responsible for the occurrence of sintering, although this should not be considered a binding statement. But only if the wax content amounts to at most 1% by weight are such undesirable sintering phenomena entirely avoided or reduced to only a slight, and tolerable, degree.

Although this also should not be considered a binding statement, it is further presumed that the combination of the low porosity and the small BET surface area are of importance because in the case of the small surface area the chlorination reaction, which appears to be limited to that small surface area, can generate less local heat than is the case with chlorination of the same quantity by weight of an ethylene polymer which has a large BET surface area. It is also presumed that the polyethylene molecules constituting the BET surface area become highly chlorinated and that these highly chlorinated polymer molecules have a high glass transition temperature, as a result of which undesirable properties are introduced to a greater or lesser degree, in proportion to the quantity of highly chlorinated ethylene polymer.

The chlorination of a small BET surface area at temperatures below the crystalline melting point in the first phase leads, however, to the formation of only minor quantities of highly chlorinated ethylene polymer. Moreover, the layer formed in this way may still be rather thin when the reaction conditions are changed over to chlorination above the crystalline melting point. This is probably the result of the low wax content. At higher wax contents, the wax, which already melts at about 40° to 70° C., will easily attack and/or dissolve a thin chloropolyethylene skin and thus cause the ethylene polymer particles to agglomerate and/or become discolored, since, in that case, it again becomes possible to have too rapid a development of the chlorination reaction.

The chlorinations according to this invention are in general carried out at temperatures of between about 15° and about 160° C., and at partial chlorine pressures of between about 0.1 to 10 atmospheres absolute. In the first stage, i.e., that which operates below the crystalline melting point, the chlorination is conducted at temperatures of from about 25° up to about 105° C., and preferably between about 75° and about 100° C. In the second process stage, i.e., that which is above the crystalline melting point, the chlorination is conducted at temperatures of about 110° to about 150° C., preferably between about 135° to about 150° C. The chlorine gas may, of course, be diluted with inert gases, like nitrogen, hydrogen chloride, water vapor, rare gases, etc., as may be desired. The partial pressure of chlorine may be the same or different between the two stages.

According to the present process chloropolyethylenes having different chlorine contents, generally from about 5% to about 70% by weight, and preferably from about 10% to about 50% by weight, can be prepared. Most particularly, chloropolyethylenes with a chlorine content of from about 30% to about 48% by weight may be prepared.

The differences in properties between chloropolyethylene products with a statistical chlorine distribution and with a non-statistical chlorine distribution are known, as has been mentioned above. A readily measurable physical property, which correlates with these differences in properties, is the so-called second-order transition temperature or the glass transition temperature. Such a second-order transition temperature can, for instance, be determined by plotting the rigidity of the polymer material as a function of the temperature. At the second-order transition temperature, the rigidity very abruptly decreases to very small values or even to zero. The tensile strength is, however, retained, i.e., the melting point, or the temperature at which the tensile strength becomes zero, is not reached. The flexibility of chloropolyethylenes is greater as the glass transition temperature is lower.

For the preparation of chloropolyethylenes it is necessary to start with ethylene polymers having a high molecular weight in order to achieve a substantial toughness and other valuable properties. The melt index of the starting polymer should therefore amount to at most about 5, and is preferably at most about 1.0.

A number of commercially available types of powdered high density polyethylenes have a wax content of more than 1% by weight.

By suitable choice of the catalyst, a polyethylene having a wax content of at most 1% By weight can be prepared therefrom.

Many commercial products have a low porosity, although the wax content thereof is not invariably less than at most 1% by weight in such cases. If necessary, the wax content of the starting polyethylene can be decreased by preliminary extraction with a hydrocarbon solvent, such as hexane, heptane, or low-boiling gasoline. Economically, it is most advantageous to start with a polyethylene which has both a low porosity and a small wax content. As appears from the Examples, polyethylenes of these characteristics are commercially available.

The porosity of the polyethylene should be at most about 0.15 cm$^3$/g and is, preferably, smaller than about 0.10 cm$^3$/g, while the BET surface area, which may amount to at most about 1 m$^2$/g, preferably amounts to at least about 0.1 m$^2$/g.

The bulk chlorination process of this invention can then be carried out in a fluidized bed, a moving bed, a horizontal reactor with stirrer, a rotating drum, or in other ways known as such for conducting reactions between gases and solids.

In order to obtain a homogeneously chlorinated product the ethylene polymer powder must be continuously mixed to ensure both a steady supply of chlorine and discharge of hydrogen chloride through and from the same. If required, the chlorination process can be carried out in the presence of free-radical-forming initiators and/or radiation, but this is generally not necessary.

Free radical-forming radiation, in general, may be light having a wave length of between 3000 to 4500 Å. Suitable free-radical-forming initiators are: peroxides and hydroperoxides, for instance benzoylperoxide, diisopropylperoxydicarbonate, benzoylhydroperoxide, cumenehydroperoxide, lauroylperoxide and the like, azo compounds in particular those with a nitrile group at a carbon atom which is adjacent to an azonitrogen atom, like dimethyl and diethyl, $\alpha,\alpha'$-azodiisobutyronitrile and $\alpha,\alpha'$-azobis ($\alpha, \gamma$-dimethylvaleronitrile). Other initiators also known as such can be used in the process according to the invention.

The heat of the reaction can be discharged from the system in different ways known as such, for instance by means of the cooling gas streams, through wall-cooling or with cooling elements installed in the reactor, when the chlorination process is carried out under practically dry conditions. The heat of reaction can also be discharged, with particular advantage, by evaporation of water, or of liquid chlorine, or other inert liquids sprayed or atomized in the reactor. Preferably, water is used for the cooling medium and may be added at the beginning of the reaction in a quantity which is at most about equal to the weight of the polyethylene powder.

Of particular importance in the practice of this invention are the chlorinated polyethylenes having a chlorine content between about 25 to about 50% by weight and a crystallinity of less than about 2%. Chlorinated polyethylenes of this kind have already found a variety of valuable applications. They combine well with most plastics and can be advantageously mixed with, e.g., PVC, polyethylene, ABS, EPDM-rubbers, polystyrene, SAN. Improvements in the impact strength, flexibility and processability, and increased flame-resisting properties in plastics, or improved oil resistance, etc. can thereby be achieved. They are particularly suitable for improving the impact strength of polyvinylchloride, for use as film, cable sheathing, and for flexible profile shapes.

The invention will now be further elucidated by the following Examples, without being limited to them, however.

EXAMPLES 1 TO 6 INCLUSIVE

Dry polyethylene powder (200 g) was transferred to a horizontally arranged Pyrex-glass reactor (capacity 4 liters, internal diameter 13 cm, wall thickness 3 mm) provided with baffles, having 28 inside ridges about 0.5 cm deep, a gas inlet and outlet, and a thermocouple (chromium alumel, with glass protective guard).

Via a Eurotherm apparatus, the thermocouple was connected to 4 infrared heating lamps of 250 Watts (Philips brand) arranged outside the reactor and to an automatic recorder (Servogor brand) on which the temperature prevailing in the reactor could be recorded. By means of a driving belt the reactor was rotated in the free atmosphere (temperature about 22° C.) by a motor, at a constant speed of 40 rpm (revolutions per minute). The contents of the reactor were made free of oxygen by passing a dry and pure nitrogen stream of 100 liter/hour through the reactor for 30 minutes.

The nitrogen stream was then replaced by a dry chlorine gas stream of 100 liter/hour, whilst the heating system was switched on simultaneously. With continuous passage of the chlorine stream and rotation at 40 rpm the contents of the reactor were heated in 10 minutes from about 22° C. up to 125° C., whereupon the temperature was kept at 125°±2° C. for about 10 more minutes via the automatically controlled heating system and, if necessary, with additional cooling of the reactor wall with a pressurized air stream of approximately 20° C.

The gases issuing from the reactor were absorbed in a 30% by weight solution of sodium-hydroxide in water. Unconverted chlorine and hydrogen chloride formed during the chlorination were bound therein.

After this reaction period at 125° C., the heating system was switched off and the chlorine stream replaced by a nitrogen stream of 100 liter/hour, which was passed through the reactor for 1 hour to remove hydrochloric acid and unconverted chlorine from the polymer. The chlorinated polymer mass was then removed quantitatively from the reactor, weighed (weight G), and then subsequently sieved over a sieve having sieve openings of 1000μ. Finally, the weight of the portion of the polymer product which was retained on the sieve (weight g) was determined. From these data the sintering percentage was calculated: i.e., % of sintering = g/G × 100%.

The following types of polyethylene were chlorinated in the manner just described.

Polyethylene A: A high density polyethylene (not commercially available), having a melt index of 0.02 g/10 min.; a particle size distribution of 100–600μ; a porosity of 0.085 cm$^3$/g, a BET surface area of 0.5 m$^2$/g, and a crystalline melting point of 110° C. The wax content, which was determined by 48 hours extraction of the polyethylene powder with n-hexane in an extraction apparatus, amounted to 3% by weight. The density was 0.9468 g/cm$^3$.

Polyethylene B: Hostalen GM 7745 P, a polyethylene powder from Hoechst, having a melt index of 0.11 g/10 min.; particle size distribution of 100–600μ; a porosity of 0.4 cm$^3$/g; a BET surface area ≦0.1 m$^2$/g, and a crystalline melting point of 107° C. The wax content is 2.8% by weight.

Polyethylene C: Hostalen GF 7660 P, also a polyethylene powder from Hoechst, having a melt index of 0.35 g/10 min.; a particle size distribution of 100–600μ; a porosity of 0.02 cm$^3$/g; a BET surface area ≦0.1 m$^2$/g, and a crystalline melting point of about 108° C.; the wax content is 1.0% by weight.

Polyethylene D: The same as polyethylene B, except that the wax content had been decreased to 0.8% by weight by extended extraction with n-hexane.

Polyethylene E: The same as polyethylene C, except that the wax content had been decreased to 0% by extended extraction with n-hexane.

Polyethylene F: A polyethylene powder obtained by grinding Stamylan-9800 pellets (a DSM polyethylene) having a melt index of 0.30 g/10 min.; a particle size distribution of 175–250μ; a porosity of 0.038 cm$^3$/g; a BET surface area ≦0.1 m$^2$/g, and a wax content ≦0.1% by weight. The crystalline melting point was 112° C. and the density amounted to 0.958 g/cm$^3$.

The results of the chlorination of these respective polyethylene (PE), notably of the results of sieving over a 1000μ sieve, are reported in Table 1.

TABLE 1

| Example | PE Code | Wax Cont. in PE before chlorination w.-% | % Sintering after chlorination | Description of sintered polymer mass | Description of non-sintered polymer powder |
|---|---|---|---|---|---|
| 1 | A | 3.0 | about 100 | coagulated mass with carbonized parts | — |
| 2 | B | 2.8 | about 100 | coagulated mass with carbonized parts | — |
| 3 | C | 1.0 | about 3 | a few small lumps with brown nuclei | white, free-flowing powder having a particle size distribution of 100–600 μ and a chlorine content of 12.8 |
| 4 | D | 0.8 | 0 | no sintering | white, free-flowing powder having a particle size distribution of 100–600 μ a chlorine content of 14.5%. |
| 5 | E | 0 | 0 | no sintering | white, free-flowing powder having a particle size distribution of 100–600 μ and a chlorine content of 14.1%. |
| 6 | F | <0.1 | 0 | no sintering | white, free-flowing powder having a particle size distribution of 175–250 μ and a chlorine content of 15.1% |

TABLE 1-continued

| Example | PE Code | Wax Cont. in PE before chlorination w.-% | % Sintering after chlorination | Description of sintered polymer mass | Description of non-sintered polymer powder |
|---|---|---|---|---|---| by weight.

These results show that high density polyethylene powders with a low external surface area can be chlorinated in bulk without, or with only few, sintering problems, even at temperatures above the crystalline melting point, provided the wax content of PE powders amounts to ≦1% by weight (Examples 3, 4, 5 and 6). At high wax contents, on the other hand, serious sintering problems occur (Examples 1 and 2).

COMPARATIVE EXAMPLES 7 TO 14 INCLUSIVE

In a manner similar to that of Examples 1 to 6, a polyethylene powder, having a melt index of 0.30 dg/min., a particle size distribution of more than 90% in the range of 50–300μ, i.e., less than 5% smaller than 50μ or larger than 300μ, a porosity of 0.243 cm$^3$/g, a BET surface area of 2.1 m$^2$/g (above the limit of this invention), a crystalline melting point of 110° C., a wax content of less than 0.1% by weight, and a density of 0.958 g/cm$^3$, was chlorinated with the provision that this time the temperature was slowly increased from 25° to 100° C.

By preliminary experiment using such method, that heating rate was established at which discoloration and/or agglomeration phenomena just did not occur. When the temperature of 100° C. was reached a chlorine content was approximately 17% by weight. (This content became higher if slower heating rates were used.) Next, the temperature was raised to 125° C. in 3 to 4 minutes, and the chlorination was then continued to various levels of final chlorine contents.

The chlorine content and the flexibility of the chlorinated polyethylene products were determined. The measurement of the flexibility was carried out by homogenizing the chloropolyethylene powder with 1% by weight of Irgastab T9* on a plastics roller, whereupon small test rods were prepared. These test rods were subjected to the Clash and Berg torsion test. The temperature was determined at which a torsion modulus of 700 kg/cm$^2$ was measured for the test rod (the so-called G-700 value). This G-700 value is a good measure of the flexibility of the chloropolyethylene. At G-700 values below 0° C. the judgment "excellent flexibility" may be given. With G-700 values above +10° C., the polymer must be considered to be insufficiently flexible.

* Irgastab T9 is marketed by Ciba-Geigy and consists mainly of dibutyltinmaleinate.

At the same time, the effectiveness of the chloropolyethylene as an agent for improving the impact strength for PVC was determined.

To this end 15 parts by weight of chloropolyethylene, 85 parts by weight of Varlan 6600 (a PVC-type having a K-value of 66, marketed by DSM), and 1 part by weight of Irgastab T9 were homogenized on a roller. From the rolled sheets, small test plates were prepared, the impact strength of which (Izod value) was determined at both 20° C. and 0° C.

The resulting measurements are summarized in Table II:

TABLE II

| Example | Chlorine Content of Chloropolyethylene (w.-% of Cl) | G-700 (°C.) | Izod (Kg/cm$^2$) at 20° C. | at 0° C. |
|---|---|---|---|---|
| 7 | 23.3 | +19 | 5.4 | 3.3 |
| 8 | 24.9 | +24 | 4.2 | 3.1 |
| 9 | 28.3 | +22 | 5.2 | 3.7 |
| 10 | 30.6 | +29 | 4.6 | 3.4 |
| 11 | 33.1 | +38 | 5.0 | 2.9 |
| 12 | 40.4 | +33 | 4.8 | 3.6 |
| 13 | 41.0 | +34 | 5.9 | 3.8 |
| 14 | 41.9 | +16 | 9.7 | 4.1 |

This shows that chlorination in bulk of high density polyethylene powder having a large external surface area leads to chloropolyethylene having an insufficient flexibility and with little effectiveness as an agent to improve the impact strength for PVC. The PVC Izod values were 3,5 kg/cm$^2$ at 20° C. and 2,8 kg/cm$^2$ at 0° C.

EXAMPLES 15 TO 23 INCLUSIVE

In a manner similar to that described in the Examples 1 to 6 PE powder A and PE powder F, were respectively freed from wax, and were then chlorinated to various final chlorine contents. The reactor and its contents, however, were, in this case, heated from 22° C. to 140° C. in 15 minutes, and, further, final chlorination took place at 140° C.±2° C. to different chlorine content levels.

None of these chlorination reactions experienced a sintering problem (i.e., the sintering percentage was zero). The end-products obtained were white, free-flowing powders.

In the manner described in the Examples 7 to 14 above, the chlorine content, the flexibility, expressed in the G-700 value, and the effectiveness of the chloropolyethylene as an agent to improve the impact strength for PVC (expressed as the Izod value at 20° C., and at 0° C.) were determined.

The results are listed in Table III.

TABLE III

| Example | PE Powder | Chlorine Content Chloropolyethylene (w.-% of Cl) | G-700 (°C.) | Izod (kg/cm$^2$) at 20° C. | at 0° C. |
|---|---|---|---|---|---|
| 15 | wax-free A | 32.4 | 0 | 22 | 12.0 |
| 16 | wax-free A | 37.1 | −7 | >120 | 19.0 |
| 17 | wax-free A | 39.2 | −2 | >120 | 16.0 |
| 18 | wax-free A | 42.1 | −2 | >120 | 17.0 |
| 19 | F | 31.9 | −7.5 | 81 | 10 |
| 20 | F | 32.7 | −2.5 | 85 | 11 |
| 21 | F | 36.2 | −12 | 94 | 10 |
| 22 | F | 36.9 | −6 | 92 | 8 |
| 23 | F | 39.7 | −5.5 | 91 | 8 |

These results (particularly in comparison to those of Table II) show that bulk chlorination of high density polyethylene powders having a small external surface area leads to products with an excellent flexibility and excellent effectiveness as an agent to improve the impact strength for PVC.

What is claimed is:

1. A process for chlorinating solid, finely divided high density ethylene polymers in bulk, which consists essentially in contacting a solid, finely divided high density ethylene polymer with chlorine gas in the absence of solvents and/or suspension agents in two stages while maintaining the temperature in the first stage below the crystalline melting point of said polymer, and conducting the second stage at a temperature above the said crystalline melting point, and wherein the time of operation of said first stage is sufficient to prevent sintering together and/or discoloration of the polymer particles in the second stage, and wherein said high density ethylene polymer has at the most 5 mol.-% of a second α-alkene of from 3 to 8 carbon atoms copolymerized therewith, has a density of between about 0.930 and 0.970, has a melt index of at most about 5, has a particle size distribution between from about 50 to about 2000μ, has a porosity of at most about 0.15 cm$^3$/g, has a BET surface area of at most about 1 m$^2$/g, and has a wax content of at most about 1% by weight.

2. Process according to claim 1, wherein the chlorination in said first stage is conducted at temperatures between about 25° to 105° C., and the chlorination in the second stage is carried out at temperatures between about 110° and 150° C.

3. Process according to claim 2, wherein the first stage chlorination is conducted at temperatures between about 75° and 100° C.

4. Process according to claim 2, wherein the second stage chlorination is conducted at temperatures between about 135° and 150° C.

5. Process according to any of claims 1 to 4 wherein each said chlorination stage is carried out at a chlorine pressure of between 0.1 and 10 kg/cm$^2$.

6. Process according to claim 1 wherein said melt index is at most 1.0.

7. Process according to claim 1 wherein said porosity is at most 0.10 cm$^3$/g.

8. Process according to claim 1 wherein BET surface area is at least 0.1 m$^2$/g.

9. Process according to claim 1 wherein water, liquid chlorine, or an inert liquid is sprayed or atomized in the reactor while said chlorination is carried out.

10. Process according to claim 9 wherein said polyethylene is mixed with at most an equal quantity by weight of water.

11. Process according to claim 1 wherein a chloropolyethylene with 5-70% by weight of chlorine is prepared.

12. Process according to claim 1 wherein a chloropolyethylene with 25-50% by weight of chlorine is prepared.

* * * * *